UNITED STATES PATENT OFFICE.

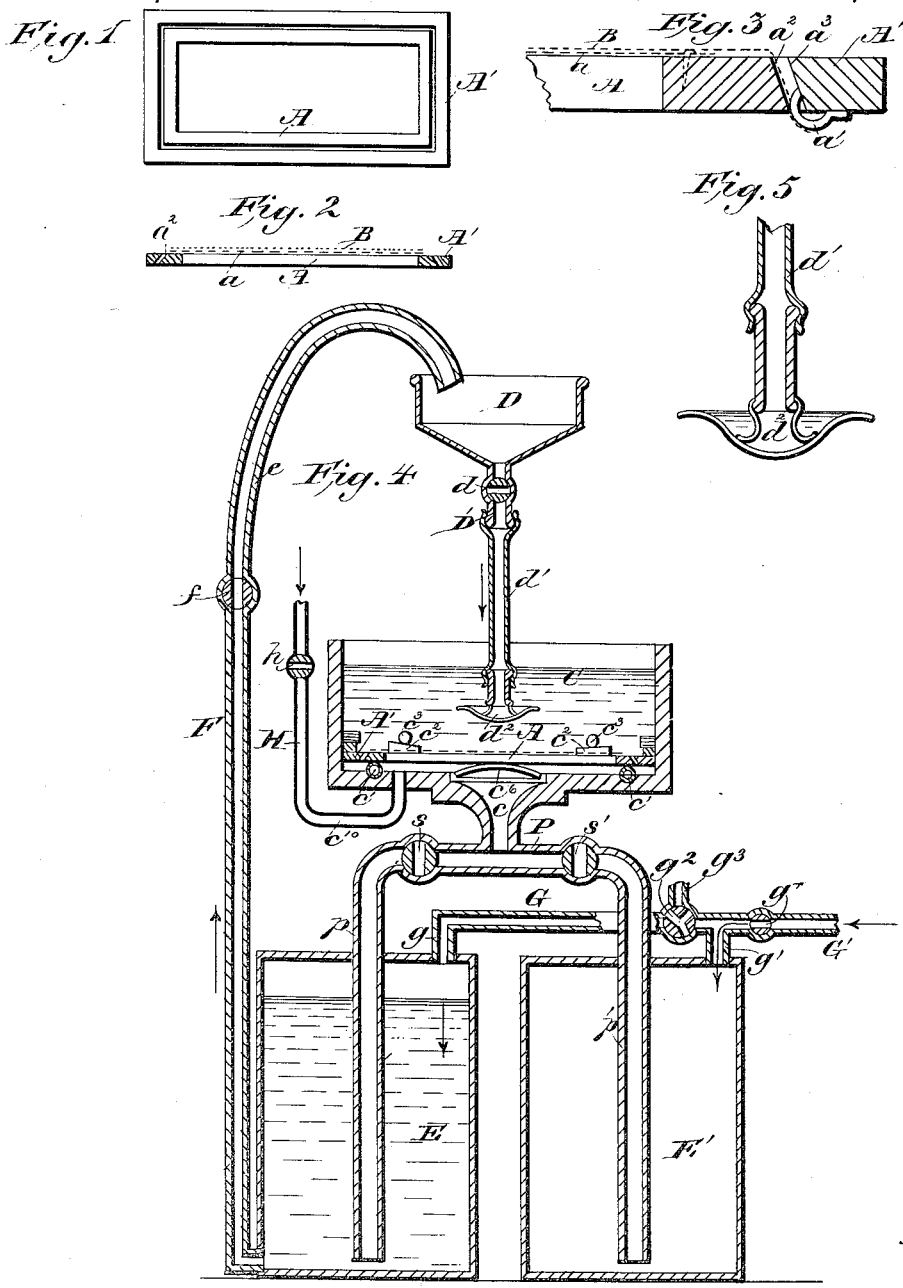
(No Model.)
F. BREYER.
PROCESS OF PRODUCING FILTERING MEDIA.
No. 336,206. Patented Feb. 16, 1886.

FRIEDRICH BREYER, OF VIENNA, AUSTRIA HUNGARY.

PROCESS OF PRODUCING FILTERING MEDIA.

SPECIFICATION forming part of Letters Patent No. 336,206, dated February 16, 1886.

Application filed October 26, 1885. Serial No. 181,036. (No specimens.) Patented in Belgium May 4, 1885, No. 68,753; in France May 5, 1885, No. 162,364; in Italy May 7, 1885, XIX, 18,334, and XXXVI, 243; in England May 12, 1885, No. 5,864, and in Austria-Hungary August 29, 1885, No. 15,098 and No. 45,354.

*To all whom it may concern:*

Be it known that I, FRIEDRICH BREYER, engineer, a subject of the Emperor of Austria-Hungary, residing at Vienna, in the Province of Lower Austria, in the Empire of Austria-Hungary, have invented certain new and useful Improvements in Processes of Producing Filtering Media; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to processes of reducing asbestus into a fibrous condition and in the preparation thereof, of filtering media, being an improvement on a certain process described in Letters Patent of the United States granted to me under date of July 17, 1885, No. 321,947.

It consists in a novel process of reducing asbestus or similar inorganic matter into a fibrous condition for the purpose of obtaining therefrom filtering media.

The invention further consists in the mode of depositing the fibers onto a suitable backing and causing the said fibers to adhere thereto.

In the production of filtering media for the filtration from fluids or gases of microbes or other microscopic impurities it is obvious that the said filtering medium should be of such fineness of mesh as to arrest the passage of these microscopic elements and impurities held in suspension in the air or another gas, or in a fluid.

To obtain a medium of the required fineness of mesh, I have found that fibers having a diameter of about one ten-thousandth of a millimeter are necessary, so as to produce a strata of sufficient porosity for filtering purposes, and of such density as to arrest or prevent the passage of microscopic organisms or elements. I have also found that fibers about five millimeters long produce excellent media for the purposes in view, and when much longer or much shorter fibers are used the medium is either of too great a mesh or it is too dense for practical purposes of filtration.

To obtain fibers of proper length and thickness, I proceed as follows: Asbestus, such as can be reduced to a fibrous or woolly condition without pulverizing the same, is ground or triturated or pounded in a suitable apparatus or subjected to a process of subdivision in a rag-engine in which the knives are set to a distance of from five to one millimeters, or any other suitable or preferred apparatus for reducing the asbestus to a fibrous condition may be employed. When this has been done, the fibers are soaked in water for several days, or boiled in water so as to separate the fibers from one another and place them in proper condition for further reduction and subdivision.

I have stated above that a fiber of a length of about five millimeters, and about one ten-thousandths millimeter in diameter is required to produce a filter that will effectually arrest the passage through it of microbes contained either in liquids or gases. This reduction and subdivision is therefore one of the important steps in the process of preparing the filtering media. I have so far been unable to find machines that will effect this subdivision and reduction of the fiber; but I accomplish this more effectually in the following manner: After the asbestus fibers have been separated or loosened by soaking or boiling, as above set forth, I mix therewith a crystalline substance that will act upon the fibers as dividing and reducing agent, and for this purpose I preferably employ either crystalline carbonate of lime or magnesia, or shells reduced to a granular condition and preferably to such a condition that the diameter of the largest granules will not exceed from three to five millimeters. This crystalline matter is thoroughly incorporated with the asbestus fibers, and in such proportions as to form with the latter a viscous or pasty mass. When in this condition, the mass is passed through a process of grinding, as, for instance, in a paint-mill, each crystal or particle of shell acting like a knife on the asbestus fiber to subdivide and reduce the same to a degree of fineness not attainable in any other manner known to me. This process of grinding is carried on until the granular material is completely reduced—that is to say, until no granules can be perceived by the naked eye. This may be readily ascertained by diluting a quantity of the ground mass in water, say about one-fourth of a cubic centimeter of the mass mixed with one half liter of water, which, when thoroughly shaken up, will present the appearance of an emulsion of uniform density and milkiness or whiteness and devoid of lumps, in which the fibers may be readily distinguished. Of course it will be understood that this reduction of the asbestus fibers may be carried on to various degrees, according to the fineness and length of fiber to be obtained, and the latter properties are to be determined by the uses made of the filtering medium, as it is obvious that the finer and shorter the fibers the greater will be the density of the filtering medium.

The next step in the preparation of the fiber is to eliminate therefrom the reducing-agent. This I effect by the chemical reaction of an acid upon the carbonate of lime or magnesia—such, for instance, as dilute hydrochloric acid when carbonate of lime ($CO_3Ca$) is employed, or sulphuric acid when carbonate of magnesia ($CO_3Mg$) is employed, the fibrous mixture being first attenuated to the consistency of cream or thick milk by means of water. This operation is performed in a vessel made of a material capable of resisting the action of the acid and under constant agitation of the mass, whereby the lime and magnesia are reduced into soluble salts—such as chloride of lime, ($CaCl_2$,) or sulphate of magnesium, ($MgSO_4$.) This solution or reduction, or, more properly, reaction, of the acid upon the lime or magnesia takes place, as is well known, under evolution of carbonic-acid gas, which permeates and agitates the mass, and therefore serves as a gaseous agent to loosen and separate the fibers and distribute them through the liquid, in which they are held in suspension during the process of reaction. The termination of the process of reaction will of course take place according to the volume of fibrous material treated, but may be readily ascertained by the well-known litmus-paper test, or by a cessation of effervescence on adding a fresh quantity of acid. Besides the above-named acids, dilute nitric or phosphoric acids may be employed. In any case the calcium or magnesium should be dissolved and the asbestus fibers held in suspension in the solution. The fibers are now ready for use in the production of filtering media, which I effect as follows: I first prepare a suitable backing for the reception of the asbestus fibers, and instead of employing a metallic backing, as described in the patent hereinbefore referred to, I employ a fabric made of vegetable or animal fibers, or, in other words, I substitute for the inorganic backing an organic backing, upon which the asbestus fibers are deposited, and then cause said fibers to adhere to the backing by felting the same. Any suitable apparatus may be employed for this purpose, either a form of apparatus such as shown and described in the patent hereinbefore referred to, or, preferably, the apparatus hereinafter described, and shown in the accompanying drawings, in which—

Figure 1 shows in plan a frame on which the organic backing is secured for the reception of the asbestus fibers. Fig. 2 shows said frame in longitudinal vertical section, and Fig. 3 is a partial sectional view thereof on an enlarged scale, illustrating the mode of securing the organic backing. Fig. 4 is a vertical transverse section of the depositing and felting apparatus, and Fig. 5 is an enlarged sectional detail thereof.

A indicates a frame the dimensions of which correspond to the dimensions of the filtering medium it is desired to obtain, said frame being preferably made of wood. The outer edges, $a^2$, of frame A are beveled from top downward, and to the upper face of the frame is secured a sheet of wire fabric, $a$, made, preferably, of brass wire of from 0.1 to 0.5 millimeters in diameter and of meshes about one millimeter wide. Upon this wire fabric is stretched a fabric, B, of vegetable or animal fibers, by clamping the edges thereof between the beveled edges $a^2$ of the frame A and the correspondingly-beveled edges $a^3$ of a second or outer frame, A', which is provided with pieces of india-rubber or a lining, $a'$, of such, whereby the adhesive or frictional contact between the beveled edges of the said outer frame, A', and the fabric B is increased and the stretching of the latter facilitated. This frame, with the fabrics stretched thereon, is placed into what I term the "precipitating vessel or apparatus." This apparatus is constructed as follows:

C is an open vessel of suitable form (cylindrical or other) in which the frame A A', with the wire and organic fabrics, is secured so as to form a tight joint and prevent any fluid from passing to the outlet-orifice except through the meshes of the fabric. This I effect in the following manner: $c'$ is a tubular india-rubber gasket or packer fitted, preferably, in a groove formed in the bottom of vessel C, as shown, and surrounding the bell-mouthed or funnel-shaped central exhaust or discharge orifice, $c$. The tubular gasket $c'$ is of the same size and shape as the frame A, which latter is placed thereon with the frame A' projecting beyond said gasket. Within the vessel C, and at a proper distance above the gasket $c'$, are formed or secured studs, pins, or blocks $c^3$, that project over the frame A' below the same, and $c^2$ $c^2$ are wedges inserted between the pins and frame A' to wedge the latter tightly on frame A, and at the same time press said frame A tightly against the gasket $c'$, so that no liquid can reach the under side of frame A and the discharge or exhaust orifice $c$ without passing through the fabrics B and $a$. Above the vessel C is supported a feed-hopper, D, the discharge-pipe of which has a stop-cock, $d$, and to the end of said pipe is connected a flexible tube, $d'$, that carries at its lower end a distributer, $d^2$. This distributer consists of a cup-shaped disk, to which are secured clamping-arms or other suitable devices for supporting the same from a metallic tubular holder, $D'$, the upper end of which is connected with the flexible tube $d'$. The discharge-orifice $c$ of vessel C is connected with two reservoirs, E and $E'$, by means of a two-branch pipe, P, having stop-cocks $s$ and $s'$, whereby the communication between vessel C and reservoirs E $E'$ through branches $p$ and $p'$, respectively, of pipe P may be established or cut off, as desired.

As shown in Fig. 4, the branches $p$ and $p'$ of pipe P extend nearly to the bottom of their respective reservoirs E or $E'$. To the reservoir E, near its bottom, is connected a feed-pipe, F, that has a valve or stop cock, $f$, which pipe extends up and curves into the feed-hopper D. To the upper head of the reservoirs E $E'$ is connected a pipe, G, whose branch $g'$ connects it with reservoir $E'$.

In an extension, $G'$, of pipe G is arranged a valve, $g^4$, whereby the communication between pipe G and reservoir $E'$ may be established or cut off, as required, and between said stop-cock $g^4$ and reservoir E a three-way valve or cock, $g^2$, is arranged in pipe G, by means of which communication may be established or cut off, as required, between branch $g$ and vessel E, branch $g^3$, vessel $E'$, and extension $G'$ of pipe G. Over the discharge-orifice $c$ of vessel C is arranged a disk, $c^6$, and with the discharge-chamber formed by the frame A, the gasket $c'$, and the bottom of vessel C is connected a pipe, H, that extends upwardly and has a stop-cock, $h$.

The operation of depositing and felting is effected as follows: The branches $g^3$ $G'$ of pipe G are connected with any suitable air compressing and forcing apparatus, such as an air pump or other suitable compressing and forcing apparatus, which I have deemed unnecessary to illustrate, for the reason that such mechanisms are too well known to require either illustration or detailed description. The reservoir or tank E is nearly filled with water, while that $E'$ is only partially filled with water, which may be readily effected through the precipitating tank or vessel D. This effected, the frame A $A'$, with its metallic and textile fabrics, is arranged within the tank C, as above described, the stop-cock $s$ in pipe $p$, the stop-cock $d$ in pipe or tubular extension $D'$ of the feed-tank D, and the stop-cock $f$ in pipe F are closed, while the three-way valve $g^2$ in pipe G is set to cut off communication with the reservoir or tank E and the branch $g^3$ of said pipe G. The stop cock or valve $g^4$ in the extension $G'$ of pipe G is now opened, and compressed air from the pump is forced into reservoir $E'$ to force the water therefrom through the branch pipe $p'$ and pipe P into the chamber formed in vessel C by and below the frames A $A'$, which water passes through the fabrics stretched on said frames, and is allowed to rise above the same to a height of about fifteen centimeters, when the stop-cocks $s'$ and $g^4$ are closed. The volume of water fed to reservoir $E'$ in the start should be about such that when said water has attained in tank C about the depth specified hereinabove said reservoir should be nearly empty. Asbestus fibers of the coarser grades are now placed in the feed-tank D in the proportion of about twenty to thirty grams per square meter of filtering media to be obtained. The stop-cock $f$ in pipe F is now opened and the three-way valve or cock $g^2$ of pipe G set to admit compressed air from branch $g^3$ to the reservoir E under sufficient pressure to force the water therefrom through said pipe F into the feed-tank D. The water pouring into D subdivides the fibers and forms a sort of emulsion, and when the feed-tank is full the stop-cock $f$ of feed-pipe F is closed and the compressed air cut off from the reservoir E. The stop-cock $d$ in the tubular extension $D'$ of feed-tank D is now opened and the contents of said tank allowed to flow into vessel C through the flexible pipe $d'$. As the water and fibers issue from the pipe $d'$, the current is deflected upwardly by the cup-shaped disk $d^2$, which is immersed in the water of the precipitating-tank C, and the fibers are thereby distributed through the bath in said tank. This distribution may be rendered more complete by agitating the bath in tank or vessel C and displacing the inflowing current by moving the distributing-disk $d^2$ to and fro in the bath in tank C through the medium of the flexible tube $d'$, either by giving said tube a to-and-fro movement or by causing the disk to describe a circle in the bath, or by imparting to said disk a compound to-and-fro and circular motion. When the contents of the feed-tank D have been transferred into vessel C, the stop-cock $d$ is closed, and about ten grams of the finer grades of asbestus fibers are placed into the feed-tank and again mixed with water. The transfer of the second charge to tank or vessel C takes place simultaneously with the discharge of the contents thereof by opening both the stop-cocks $d$ and $s'$ simultaneously. The three-way valve or cock $g^2$ is at the same time set to admit compressed air from $g^3$ to G and reservoir E, while the stop-cock $g^4$ is set to allow the air in $E'$ to escape into the atmosphere, and the stop-cock $f$ in pipe F is kept open to permit the water from reservoir E to flow continuously into the feed-tank D and thence to vessel C. A circulation is thus established between reservoir E, feed-tank D, precipitating-vessel C, and reservoir $E'$. The vessel C, and the two reservoirs E and $E'$ are of the same capacity, and when the reservoir E is empty, which is indicated by a cessation in the flow of water from pipe F, the reservoir $E'$ will be full, and the stop-cock $s$ must now be opened and the admission of compressed air to said reservoir E cut-off, and the three-way valve $g^2$ set to allow the air to escape. When the level of the liquid in C has fallen to a level with the frame A A', the remaining liquid is drawn off very slowly, partly closing the stop-cock $s'$ in pipe P until the level of liquid has sunk below the level of the fabrics on frame A A'. When this has taken place, the stop-cock $h$ in pipe H is opened to admit air to the chamber below the frame A A', and the stop-cock $s'$ is now fully opened to allow the remaining liquid to flow into reservoir E'.

To avoid all disturbance of the liquid in tank C below the frame A A' which may be caused by suction of the outflowing water, I place over the flaring discharge-opening a disk, $e^6$, Fig. 4, so that but a comparatively narrow opening or slot is formed between said disk and the bottom of vessel C, which at that point has an annular recess or shoulder for this purpose, as shown.

By means of the described construction of apparatus, the mode of arranging the frame within the depositing or precipitating vessel, and the circulating of the water through the permeable fabrics on said frame it will be readily understood that the deposit of asbestus fibers upon the organic fabric must necessarily be a uniform one, which is due to the following causes: If, during the first stages of deposition the asbestus fibers should not be deposited in a uniform layer upon the fabric, it is evident that the water will pass through the thinnest portion of the layer mesh more rapidly than through the denser or thicker portions. The current being swifter at those points, will carry along with it a greater quantity of the asbestus fibers and deposit the same upon those thinner portions until the strata or layer of asbestus becomes of uniform thickness and density, thereby producing a filtering medium of uniform porosity.

There is another important result obtained by the described mode of depositing the asbestus fibers, in that the deposit is not affected by a juxtaposition of the fibers, which are precipitated upon the fabric in different directions and positions, and the pressure exerted by the water and the suction on its passage through the fabrics and from the vessel C causes said fibers to become interwoven or felted, thus resulting in a felted sheet of asbestus fibers.

When the operation of felting is completed, the frame A A' is withdrawn from the vessel C and suspended vertically in a drying-chamber, in which the temperature is so regulated as to effect the drying in from three to four hours. The felted fibers will then become perfectly white, and will be found to adhere closely to their textile backing, thus rendering cementation or other process to cause adherence to one another and their support unnecessary.

The water in tanks E E' may be used repeatedly, and from three to four filtering media may be obtained in an hour.

It will be seen from what has been said that this mode of preparing the fibers, and from the fibers the filtering media, differs essentially and materially from the modes described in the patent hereinabove referred to, that it is more expeditious, simpler in its execution, is carried out at considerably less expense, and filtering media of equally good qualities can be obtained.

The construction of the described apparatus may be variously modified, and in fact any other construction that will give substantially the results set forth may be employed. I do not wish to limit myself to any particular construction of apparatus, nor do I desire to claim herein the apparatus shown and described, as I may desire to claim the same in a separate application for patent.

I do not desire herein to claim the product obtained by the above-described process, as I have claimed this in a separate application for patent filed on or about the 4th day of June, 1885, Serial No. 167,597.

What I claim is—

1. In the production of filtering media from asbestus fibers, the mode of reduction described, which consists in mixing with the coarsely-subdivided asbestus fibers a crystalline carbonate (or shells) soluble in acids, and triturating or grinding the mixture, substantially as set forth.

2. In the production of filtering media from asbestus fibers, the mode of eliminating the crystalline carbonate from the asbestus fibers, which consists in treating a mixture of triturated or ground asbestus fibers and carbonate with an acid that will not affect the asbestus fibers but dissolve the carbonate and produce effervescence by reaction, as described.

3. In the production of filtering media, the mode of felting the asbestus fibers to a fibrous backing, which consists in applying pressure to the liquid in which the fibers are held suspended and forcing such liquid under pressure through the fibrous backing, substantially as herein described.

4. In the production of filtering media from asbestus fibers, the mode of uniformly depositing the asbestus fibers upon a fibrous backing or support, which consists in immersing the support in a volume of water in which asbestus fibers are held in suspension, exhausting the water through the fibrous support by suction, and repeating the operation of depositing with fresh charges of water and asbestus fibers, as described.

In testimony whereof I affix my signature in presence of two witnesses.

FRIEDRICH BREYER.

Witnesses:
JAMES RILEY WEAVER,
HENRY DAVIDS.